United States Patent [19]
Andres

[11] Patent Number: 5,724,569
[45] Date of Patent: Mar. 3, 1998

[54] APPARATUS FOR EVALUATING DATABASE QUERY PERFORMANCE HAVING LIBRARIES CONTAINING INFORMATION FOR MODELING THE VARIOUS SYSTEM COMPONENTS OF MULTIPLE SYSTEMS

[75] Inventor: Frédéric Andres, Paris, France

[73] Assignee: Bull S.A., Paris, France

[21] Appl. No.: 496,149

[22] Filed: Jun. 28, 1995

Related U.S. Application Data

[63] Continuation of Ser. No. 952,756, Jan. 13, 1993, abandoned.

[30] Foreign Application Priority Data

Mar. 29, 1991 [FR] France .................................. 91 03915

[51] Int. Cl.$^6$ ...................................................... G06F 17/30
[52] U.S. Cl. ............................................. 395/602; 364/578
[58] Field of Search ................................... 395/601, 602, 395/605

[56] References Cited

U.S. PATENT DOCUMENTS

| | | | |
|---|---|---|---|
| 4,829,427 | 5/1989 | Green ........................................ | 395/600 |
| 5,168,563 | 12/1992 | Shenoy et al. ........................... | 395/500 |
| 5,175,696 | 12/1992 | Hooper et al. ........................... | 364/489 |
| 5,269,014 | 12/1993 | Ogino ....................................... | 395/500 |

OTHER PUBLICATIONS

Communications of the Ass'n for Computing Machinery, vol. 23 No. 9, 1980, pp. 511–512, Kumar et al. "Computer System . . . " Design Using a Hierarical Approach to Performance Evaluation.

Proceedings of The IEEE, vol. 75, No. 5, 1987, pp. 563–571 Hevner et al., "Querying Distributed Databases on Local Area Networks . . . ".

Proceedings of The 5th Int'l Conf. on Distributed Computing Systems, 1985, pp. 282–291, Carey et al., "Dynamic Task Alocation in a Distributed Database System . . . ".

Casas et al, "Structure and Validation of an Analytic Performance Predictor for System 2000 Databases," INFOR, vol. 27, No. 2, May 1989, pp. 129–144.

Dewitt et al, "A Performance Evaluation of Database Machine Architectures", IEEE, 1981, pp. 199–213.

Lie et al, "Analytical Performance Evaluation of Relational Database Machines", Kluner Acad. Pub., 1988, pp. 401–414.

*Primary Examiner*—Thomas G. Black
*Assistant Examiner*—Jack M. Choules
*Attorney, Agent, or Firm*—Kerkam, Stowell, Kondracki & Clarke P.C.; Edward J. Kondracki

[57] ABSTRACT

An apparatus for adaptable performance evaluation of an application including queries by analytical resolution of a data base, and operating on an information processing system having a given architecture, including a library for knowledge of the specific environment of a data base. The knowledge library, in an environment specification language, includes an architecture library for modeling hardware architectures; a system library modeling the operational and transactional systems supported by the hardware architectures; an access and operation method library modeling the algorithms used by the data management system; and a library of data base profiles collecting knowledge on the data base layout and statistics on the user application. A local optimizer uses a performance evaluator to evaluate the application and select an optimal plan for the execution thereof using the information in the knowledge library including information on the given architecture.

33 Claims, 20 Drawing Sheets

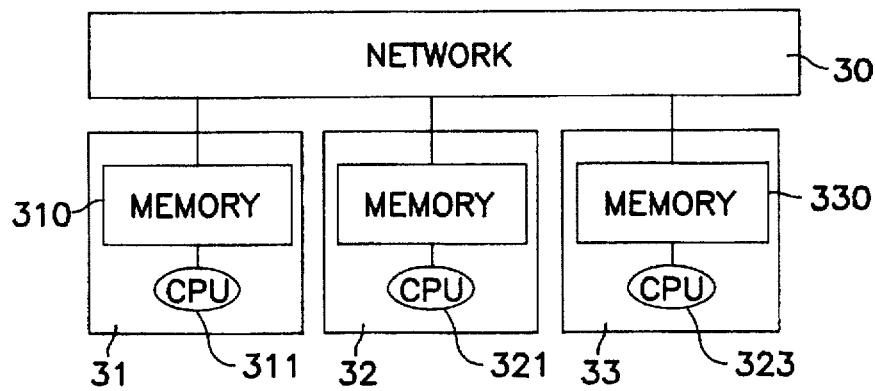
FIG. 3
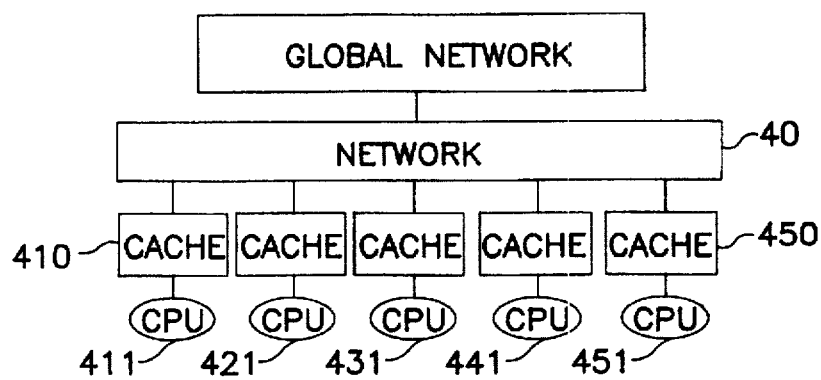
FIG. 4
```
EDS1=ARCH_BEGIN
       DELTA_NETWORK deltacpn;
       DM(3*(MEMORY memcpn, CPUcpucpn));
    ARCH_END
```
FIG. 7
```
EX2=ARCH_BEGIN
       BUS buscpn;
       SM GLOBAL MEMORY memcpn;
       5*(CACHE cachecpn, CPUcpuname);
    ARCH_END
```
FIG. 8

```
<environment> ::= <declaration> | <component specification> ;
<declaration> ::= <ARCH declaration> | <DD declaration> | <ALG declaration> ;
<component specification> ::= <ARCH component specification> | <DD component specification> ;
<ARCH declaration> ::= <name> '=' ARCH_BEGIN
                            <Arch body>
                       ARCH_END;

<Arch body> ::= <Interconnection Network>'; <Component List> ;
<Interconnection Network> ::= BUS <name> | CROSSBAR <name> | DELTA_NETWORK <name> ;
<ARCH component specification> ::= <SM component specification> | <DM component specification>;
<SM component specification> ::= <mem-comp> | <cpu-comp> | <cache-comp>;

<DM component specification> ::= <mem-comp> | <cpu-comp> | <inter_net-comp>;

<mem-comp> ::= MEMORY <name> '=' ('MEMSIZE '='  <int> ';' MAT '='  <int> ')' ;

<cpu-comp> ::= CPU <name> '=' ('C_m '='  <int> ';' C_comp '='  <int> '; S_comp '='  <int> ';'

C_b '='  <int> ';' C_e '='  <int> '; C_s '='  <int> '; C_j '='  <int> ')' ;

<inter_net> ::= INTERCONNECTION <name> '=' ('( PacSi '='  <int> '; Smt '='  <int> ';

Rmt '='  <int> '; Pkt '='  <int> ')';
```

FIG. 5A

```
<cache-comp> ::= CACHE <name> '=' '(' CACHES1 '=' <int> '; CAT '=' <int> ')';

<name> ::= (<character>)+;

<int> ::= (<digit>)+;

<Component List> ::= SM <SMA Components> |
                     DM '(' <int> '*' '(' MEMORY <name> '; CPU <name> ')' )+ ;

<SMA Components> ::= GLOBAL MEMORY <name> ';
                     ( <int> '*' '(' CACHE <name> '; CPU <name> ')' )+ ;

<DB declaration> ::= DB_BEGIN
                     (<relation>)+
                     DB_END;

<relation> ::= <name> <relation component> '(' (<attribute>)+ ')' ;

<attribute> ::= <name> <attribute component> <structure> ;

<structure> ::= INDEX <index component> | HASHED <hash component> | NONE ;

<BD component specification> ::= <relation component> | <attribute component> |
                                 <index component> | <hash component>;

<relation component > ::= '(' NAME '=' <name> '; CARD '=' <int> '; SIZE '=' <int> ';
                          ATT_NB '=' <int> '; MAX_BU_TU_NB '=' <int> ';
                          BU_TU_NB '=' <int> ')' ;
```

FIG. 5B

```
<attribute component> ::= '(' NAME '=' <name> ';'
                              DIFF_VALUE_CARD '=' <int> '; SIZE '=' <int> ';'
                              DISTRIBUTION '=' <distribution type> ';'
                              RELATION_NAME '=' <name> ';'
                              TYPE '=' <attribute type> ';' < min & max values> ')' ;

<distribution type> ::= U | N ;
<attribute type> ::= I | R | S ;
<min & max values> ::= MAX_VAL '=' <int> ';' MIN_VAL '=' <int>
                     | MAX_VAL '=' <real> ';' MIN_VAL '=' <real> ;
                     | MAX_VAL '=' <longint> ';' MIN_VAL '=' <longint> ;

<index component> ::= '(' NAME '=' <name> '; SIZE '=' <int> ';'
                          ITEMS_NB '=' <int> ';' VALUE_NB '=' <int> ')' ;
<hash component> ::= '(' NAME '=' <name> ';' ')' ;
```

FIG. 6A

```
<longint> ::= (<digit>)+;
<real> ::= (<digit>)+ [.(<digit>)*] [ [E,e] [+,-] (<digit>)+];

<ALG declaration> ::= <name> '=' ALG_BEGIN
                          <ALGO body>
                      ALGO_END;

<ALGO body> ::= ARCH_VAR ( <name> )*  ';'
                SYS_VAR ( <name> )*  ';'
                DB_VAR ( <name> )*  ';'
                QUERY_VAR (<name>)* ';'
                DEF (<definition_part>)+ ';'

<definition_part> ::= <name> '=' <instruction> ';'
<instruction> ::= <name> '=' <op> <instruction> |
                  <name> op <name> |
                  <name>;

Filter_Map=ALGO_BEGIN

ARCH_VAR (*imported variables from architecture library*)
    $C_i, C_e$; (*cost of a single instruction and of evaluating a simple predicate*)

SYS_VAR; (*imported variables from system library*)
    Pcreat; (*Process creation cost (in instructions)*)

DB_VAR (*imported variables from database profile library*)
    R.CARD, pred_est(); (*function to estimate the number of evaluated predicates per scanned tuple*)

QUERY_VAR (*information given by the input query*)
    R, qualif; (*qualif : predicate expression*)

CONST (*constant definition*)
    $C_{init} = 200; C_{next} = 150;$ (*number of instruction*)

101 { (encompassing the above ARCH_VAR through CONST blocks)

FIG. 10A ($C_{init}$: cost for initializing the relation scan and for getting the first tuple,
$C_{next}$: cost to get the next tuple*)

DEF $Cost_{fm\_cpu} = P_{creat} * C_i$
$+ C_{initscan}$ (*Initialization cost to get the first tuple*)
$+ C_{scan}$; (*cost to get the next tuples*)

$C_{initscan} = C_{init} * C_i + pred\_est(qualif) \ C_e$;

$C_{scan} = (R.card - 1) * (C_{next} \ C_i + pred\_est(qualif) * C_e)$;

ALGO_END

Ace — Processor/CPU Description

K1: Index creation coefficient

K2: Test index coefficient

Ccomp: Cost of company two words

Ce: Cost of evaluating a predicate

Ch: Cost to Calculate a hash address

Scomp: Size of a word in a simple comparison

Cm: Cost of displacing a pointer

Ct: Cost of creating one file — 1410

Ci: Cost of a simple instruction — 1411 np: Number of processors — 1412

Cs: Cost of basic sorting operation — 1413

APPARATUS FOR EVALUATING DATABASE QUERY PERFORMANCE HAVING LIBRARIES CONTAINING INFORMATION FOR MODELING THE VARIOUS SYSTEM COMPONENTS OF MULTIPLE SYSTEMS

This is a Continuation of application Ser. No. 07/952,756, filed Jan. 13, 1993 now abandoned.

BACKGROUND OF THE INVENTION

The present invention relates to an improved apparatus for adaptable performance evaluation by analytic resolution. This apparatus is adaptable to novel types of machine architecture, on the one hand, and systems on the other, and makes it possible to evaluate the response time of a query, the total execution time, the rate of memory occupation resulting from a query, and a statistical profile of the results. An apparatus of this kind must be capable of being used by various types of data base management system. The analytical resolution is made possible by modeling the environment in the form of a formula, instead of resolution by simulation.

Finally, this apparatus may also be used as a configurator (called degree of freedom), that is, by fixing some of the elements, it makes it possible to begin an improvement in the other elements; for example, by fixing an architecture and a system for a given application, it makes it possible to find the data base management system (SGBD) most suitable for that type of configuration. On the other hand, for a particular data base management application, it is possible to define the architecture of the system that is best adapted to the types of queries, by determining the set of queries generally used.

SUMMARY OF THE INVENTION

This object is attained in that the apparatus for adaptable performance evaluation by analytical resolution includes a knowledge library of the specific environment of the data base and a means for evaluating performance. In the environment specification language (ESL), the libraries include the following:

an architecture library that models the hardware;

a system library modeling the operational and transactional systems supported by the hardware architectures;

an access and operation method library modeling the algorithms used by the data management system;

a library of data base profiles collecting knowledge on the data base layout and statistics on the user application.

In another particular feature of the invention, the description of the general architecture depends on whether it is classified as distributed memory architecture, shared memory architecture, or an architecture including a mixture of the two.

In another particular feature of the invention, the evaluation core comprises two layers, a first layer executing the local evaluations (algorithms applied to a packet of data) and the other layer executing the non-local (global, data communication or materialization) evaluations.

In another particular feature of the invention, the data base profile library contains the information on the structure of the data base, which is relationally oriented (relation, attribute, index).

In another particular feature of the invention, the local evaluation calculates only the various local algorithms applied to the data and is limited to one calculator node at a time, which is either a processor or a data packet.

In another particular feature of the invention, the global evaluation takes into account communications and the construction of intermediate results and of the final result.

In another particular feature of the invention, the parallelizer determines which global algorithm will be used to perform the inter-operation parallelism among the calculator nodes.

In another particular feature of the invention, the global algorithm specifies the processing performed globally on the data and the data packets that are involved, as well as how the intermediate data will be shared.

In an exemplary use, the hardware modeling library includes an attribute that defines the memory size in numbers of bytes (Mem-Si);

an attribute defining the access time per byte to the memory (MAT);

an attribute defining the execution time by the processor of a single instruction ($C_i$);

an attribute defining the execution time by the processor of a displacement of a pointer ($C_m$);

an attribute defining the maximum data size at the time of a simple comparison for a basic datum ($S_{comp}$);

an attribute defining the cost of a simple comparison between two basic data ($C_{comp}$);

an attribute defining the cost for calculated an address calculated by a hashing function ($C_h$);

an attribute defining the cost of evaluating a simple predicate ($C_e$);

an attribute defining the cost of a basic sorting operation ($C_s$);

an attribute defining the frame size in number of bytes (Pac-Si);

an attribute defining the time for sending one frame ($S_{mt}$);

an attribute defining the time for receiving a frame ($R_{mt}$); and finally, an attribute defining the time for transferring one frame between two processors ($P_u$), and a description of the general architecture constituted on the basis of the components.

In an exemplary use, the data base profile takes the following information into account:

name of the relation (Rel-Na)

cardinality in number of tuples (Rel-Ca)

size of the tuples in number of bytes (Tup-Si)

attribute number in a tuple (Att-Nu)

degree of parallelism in processor number, furnishing the number of processors manipulating the relation (Deg) at the same time memory access number for reading the key attributes (Rka-Nu)

size of a data packet in number of tuples, without semantics (Ch-Si)

size in number of tuples of a data packet, with semantics (Bu-Si)

For the attributes that the relation contains:

the name of the attribute (Att-Na)

the number of distinct values for that attribute (Att-Nv)

the mean size of the attribute in number of bytes (Att-Si)

the maximum value of the attribute (Att-Mav)

the minimum value of the attribute (Att-Miv)

the distribution of attribute values (Att-Dis);

In the case of the indexes:

the size of a tree page B in number of objects (Btp-Si)

the number of index values (In-Nv)

the size of the key in number of bits (In-Si).

Another object is to permit presentation and easy constitution of the libraries. This object is attained in that the knowledge library is associated with library presentation and constitution software.

In another particular feature, the presentation software is associated with an architecture selection form which will be taken into account for the evaluation process, executed by the evaluation means (8).

In another particular feature, the presentation and description software enables the display of at least one specific window for each library, enabling its description.

In another particular feature, the architecture library is associated with an architecture configuration window enabling the display and selection of description windows for the CPU, memory, and interconnection network components that constitute the architecture. Other components may be added as a function of novel architectures.

In another particular feature, each window includes a certain number of boxes to be filled, which come under the control of an editor once a box is activated with a button on the mouse, to enable inputting the attributes of each library through the keyboard, and a box making it possible to assign a name to the set of attributes of one component.

In another particular feature, the selection form includes a window with a plurality of scrolling boxes, which makes it possible, for each box associated with each component constituting the architectures of the hardware library to select, by way of the name assigned to the components, the attributes defining the component corresponding to the desired architecture configuration, by shifting the highlighting and validating via a validation button (OK).

In another particular feature, the architecture selection form includes one component selection button, highlighted, in each scrolling box.

In another particular feature, the architecture form includes a load button and a save button.

Another object is to propose an exemplary use of the performance evaluation apparatus, and this object is attained by a use in a compiler, including a program (PARSE) for syntactical and semantic analysis of the extractions requested;

the catalog manager enabling the syntactical and semantic analysis program (PARSE) to perform the semantic verifications;

an optimizer and parallelization program performing:

a) the rewriting of the extractions in a logical optimization routine;

b) the production of an optimal execution plan in a physical optimization routine;

c) the explicit formulation of the execution strategy in a parallelization routine fixed by the physical optimization.

In another particular feature, the apparatus is used in a set including a compiler, including a program (PARSE) (2) for syntactical and semantic analysis of the extractions requested, communicating with a catalog manager (5), with optimizer-parallelizer software (6), with presentation software and cost evaluation software, characterized in that the results of the cost evaluation are presented in a form constituted by a window divided into three zones, an object locking zone, a transaction zone, and an impasse resolution zone.

BRIEF DESCRIPTION OF THE DRAWINGS

Further characteristics and advantages of the present invention will become more apparent from the ensuing detailed description, referring to the accompanying drawings, in which:

FIG. 3 shows a first exemplary of system architecture;

FIG. 4 shows a second example of system architecture;

FIGS. 5 and 6 show the grammar of the environment specification language (ESL);

FIG. 7 shows the use of this language to define the architecture of FIG. 3;

FIG. 8 shows the use of this language to define the architecture of FIG. 1;

FIGS. 10A and B show an example of an access and operation method;

FIGS. 14A–14B show the window displayed by the library presentation and constitution software for editing the description of a processor component of the library;

DESCRIPTION OF THE PREFERRED EMBODIMENTS

New information processing applications, such as office information processing systems and expert systems, influence the future generation of data base systems. These applications require increasingly high-performance data base management systems, in terms of the response time for the user. This object can be attained by improving the query compilers, by parallel execution of queries, and by the use of high-performance parallel relational algorithms.

If high performance is to be attained, the query optimizer is fundamental. One way to increase its optimization capacity is to improve its ability to evaluate the query execution times with precision. The role of the query optimizer is to deduce an effective execution plan for obtaining the information for the user. For example, this plan specifies all the information, the access method, and the order of operation in order to calculate the query. The optimizer must be capable of optimizing both simple and very complex queries. Some applications, such as logical programming, introduce expressions that have hundreds of junctures (relational operation). To select the plan to be executed, the query optimizer needs to evaluate a number of possibilities, with the aid of a program for evaluating performance, hereinafter defined as cost. Cost evaluation is based on cost model that makes it possible to estimate the cost of the query while taking into account the specifics of the calculator and of the data base used.

Figure 11:
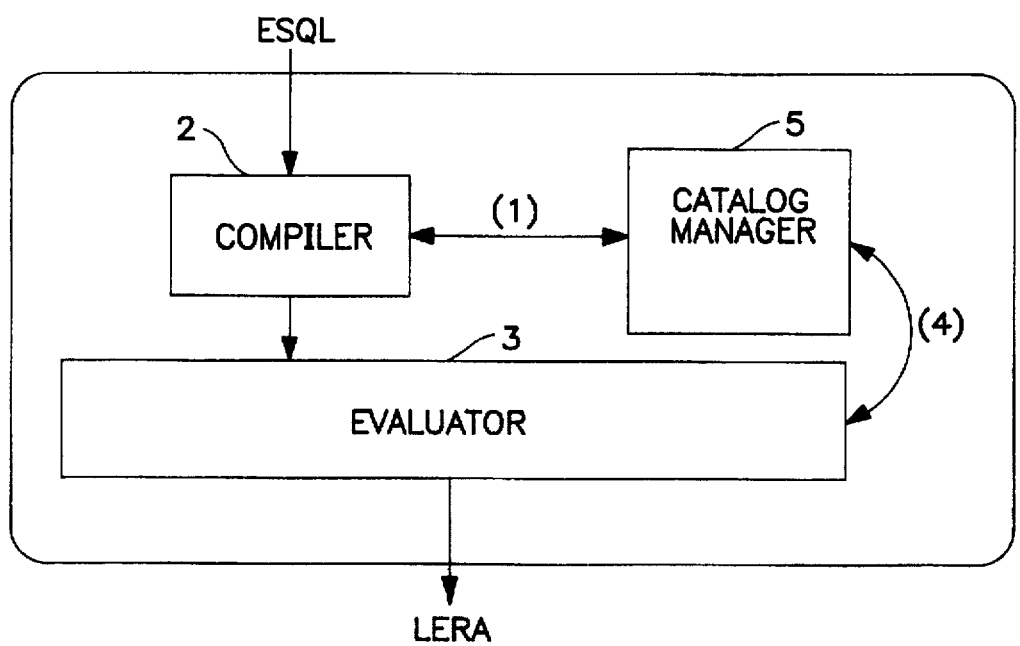
FIG. 11 shows an example of a compiler incorporating a nonadaptive evaluator.

An evaluation apparatus according to the prior art is shown in FIG. 11, in which the architecture of a compiler can be seen that includes a program (PARSE) (2) for syntactic and semantic analysis, which communicates on the one hand with a catalog manager (5) intended to define the characteristics of the data base and exchanging information on the one hand with the syntactical analysis program and on the other with an optimizer program (4) including a cost evaluation model specific to the compiler and to the hardware used. This evaluation model is incorporated into the optimizer and cannot be used except for the architecture in question of the information processing system on which these programs are run. In such architecture, the evaluation model is developed especially for a specific centralized environment and cannot be easily generalized. On the other hand, the cost of a complex function is difficult to express, and in the case where a plurality of methods are used for the same query, it is difficult to separate out their costs in a simple way.

Figure 1:
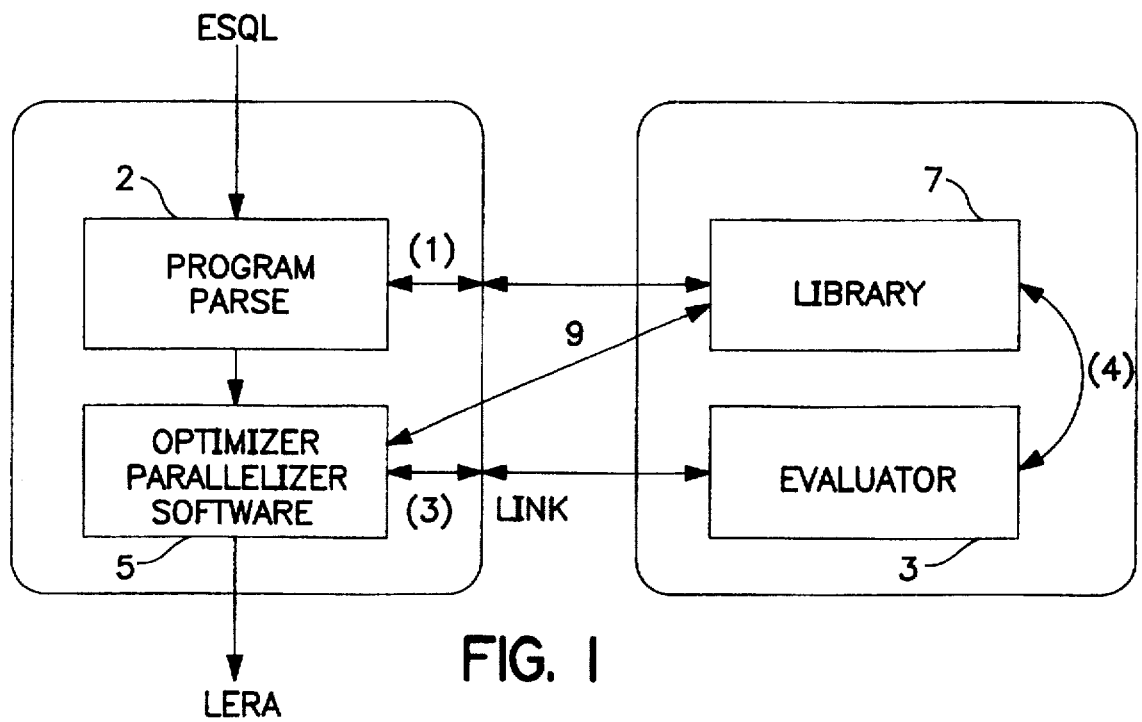
FIG. 1 shows a compiler architecture using the adaptive evaluation apparatus according to the invention.

FIG. 1 shows the invention, in which the compiler and the evaluation apparatus are made independent, and in which the same reference numerals have been preserved for the same elements. The compiler includes a syntactical and semantic analysis, which communicates on the one hand with a catalog manager (5) and on the other with an optimizer and parallelizer software (6). This optimizer and parallelizer software (6) exchanges information with the evaluator (8) via the link (3). The evaluator (8) exchanges information on the architecture on the basis of which the evaluation is to be done, which may vary from the information processing system architecture in which the evaluation is performed, and on the data base having the catalog manager (5). The optimizer-parallelizer (6) executes three compiling phases: a first, called logical optimization, which enables rewriting the queries; a second, which enables the physical optimization by producing an optimal execution plan; and a third, the parallelizer phase, which makes explicit the execution strategy fixed beforehand by the physical optimization. The optimizer-parallelizer primarily calls upon the catalog manager (5) to obtain the information over the relational route via the link (9). The optimizer (6) makes an evaluation of the query tree in order to produce an optimal execution plan. This necessitates the analysis of a plan set that is sufficiently large to contain the optimal plan yet is sufficiently limited to preserve an acceptable optimization time. The selection of the plan is done with the aid of the evaluations made by the evaluator (8). Each time the optimizer calls upon the evaluator via the link (3) can be expressed by a data base programming language, such as LERA (published in the report EDS.DD 1110001, entitled LANGUAGE FOR EXTENDED RELATIONAL ALGEBRA, by S. Kellet) or LERA-PHY (physically optimized LERA). The optimizer-parallelizer (6) must perform an optimization on two levels:

a local optimization, limited to one calculator node at a time and exploring only the various possible local algorithms. The choice of the least cumbersome local algorithm depends primarily on the estimation of the execution time.

a global optimization, taking into account communications and the construction of the intermediate and final results. The optimizer determines which global algorithm will be used to obtain an inter-operation parallelism among the nodes of the calculator. The global algorithm specifies which nodes are involved and how the intermediate data are shared among them. At the end of its work, the optimizer decides the order of operations in the calculation, and it also decides the way in which the intermediate relations used for the query tree will be produced.

Figure 2:
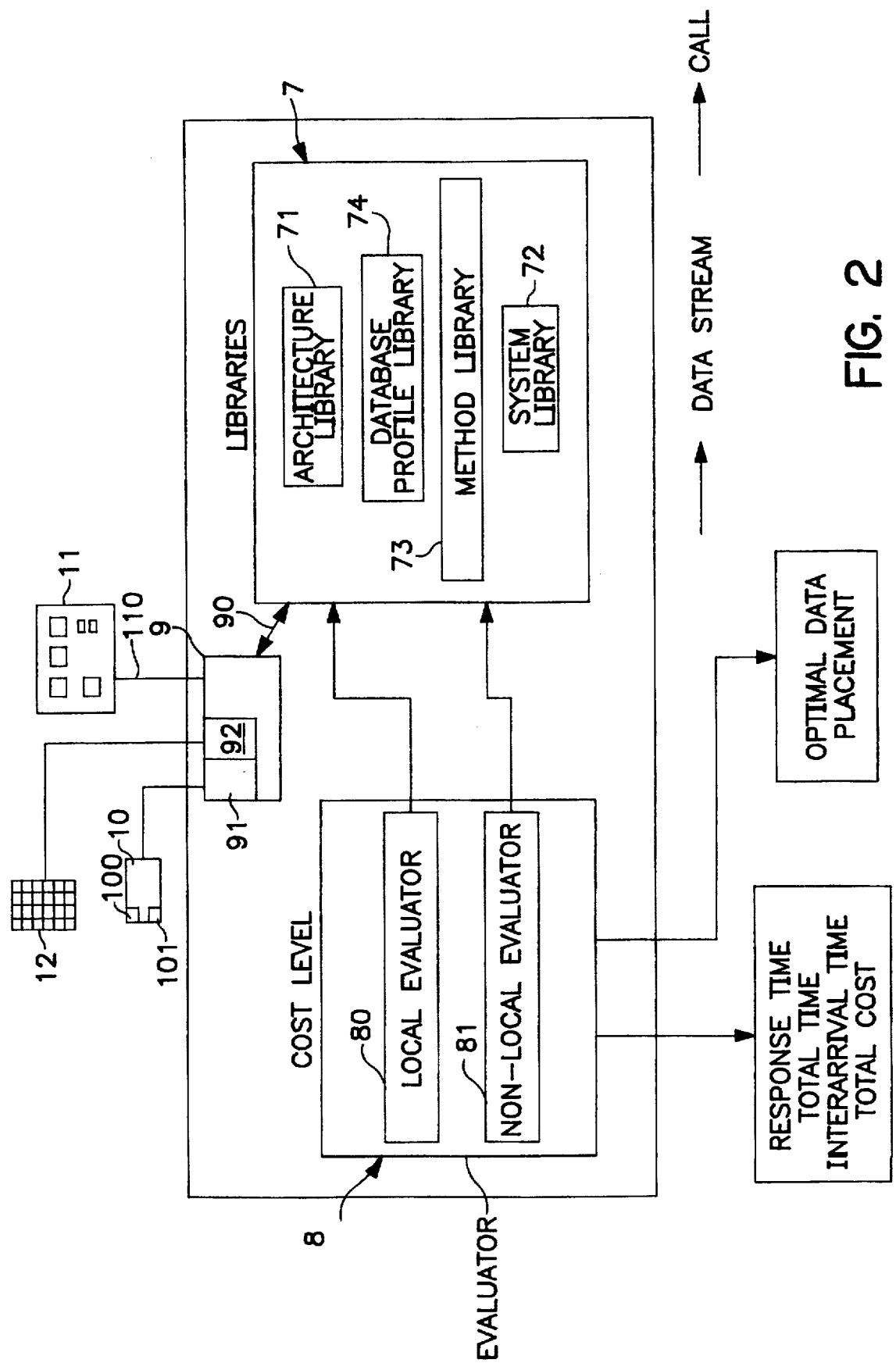
FIG. 2 shows the adaptive evaluator.

In a multi-environment approach, the libraries (7) are a way of storing knowledge on the specific environments, enabling expandability and adaptability without compromising on the efficiency of the evaluation. The library (7) is made up of four libraries, as shown in FIG. 2:

one library (71) constituting the library of architectures, modeling the hardware architectures (HARDWARE), in which the data base management system is installed;

one system library (72) modeling the operating and transactional systems supported by the hardware architectures (HARDWARE) and supporting the data base management system;

one access and operation method library (73), modeling the algorithms used by the data manager;

and finally, one data base profile library (74) grouping the knowledge on the subject of the data base layout and on statistics on the use of the data. The user furnishes the system with the information relating to the environment, by using an environment specification language (ESL), shown in FIGS. 5 and 6, for each library unit. Each unit is compiled to generate an object-oriented library.

The evaluation core (8) includes two layers, one executing the non-local cost evaluations (81) and the other the local evaluations (80). The first layer for evaluating non-local cost (81) takes into account the temporary relations and the data transfers in progress.

The second layer (80) calculates the local costs for the central processing unit and the resultant size of information, using the information stored in the library and the estimations of input operand size.

The library (71) describing the architecture contains descriptions of the general architecture and descriptions of the components. Each component is described in terms of specific properties for the memory, one example of which is described as follows:

the memory size in numbers of bytes (Mem-Si);

the memory access time per byte (MAT);

for the central processing unit:

the cost of a single instruction ($C_i$);

the cost of displacement of a pointer ($C_m$);

the maximum size of information in a simple comparison ($S_{comp}$);

the cost of a simple comparison between two basic data ($C_{comp}$);

the cost for calculated an address calculated by a hashing function ($C_h$);

the cost of evaluating a simple predicate ($C_e$);

the cost of a basic sorting operation ($C_s$);

for the interconnections:

the frame size in number of bytes (Pac-Si);

the time for sending one frame ($S_{mt}$);

the time for receiving a frame ($R_{mt}$);

the time for transferring one frame between two processors, assuming that the interconnection network is not saturated (Ptt).

The architecture library (71) also includes a general architecture portion containing a high-level description of the architectures used in the evaluation studies. At this level, a calculator architecture is seen as a collection of interactive components, and focusing is done on the basis of knowing whether a distributed memory architecture or a shared memory architecture is involved (memory level number, hierarchies, interconnection types and dimensions, and so forth). Hence one architecture example is shown in FIG. 2, in which an interconnection network (30) connects three blocks 31, 32, 33, each including a central processing unit (311, 321, 323) and a memory (310, 320, 330, respectively) associated with this processing unit. The memories (310, 320, 330) are distributed, but may also be shared by the interconnection network (30) with the processor of some other entity. A different type of architecture is shown in FIG. 4, in which the interconnection network (40) is connected on the one hand to a set of cache memories (410–450), each associated with a processor (411–451), and on the other hand a global memory (50) shared among the five processors (411–451). The library (71) includes descriptions of the various types of architectures that may be encountered.

The grammar of the environment specification language (ESL) is shown in FIGS. 5 and 6 and makes it possible to describe the various information processing environments that may be encountered. The environment specification language (ESL) is characterized by an object-oriented attributed grammar. This language is formed of units (architecture, base profile, etc.), which in turn are composed of object classes, each object class being constituted of triplets (name, semantics or definition of the name, value). The language is used, for example, to describe the architecture shown in FIG. 3, and this description corresponds to that of FIG. 7. Similarly, the architecture shown in FIG. 4 is described by the instructions in FIG. 8. In this language, the statement INT means that an integer is involved; ATT-NB means the attribute number, MAX-BU-TU-NB means the maximum number of tuples in a packet with semantics. The type of distribution may assume the values U/N, U for uniform distribution and N for nonuniform distribution. Similarly, the attribute type may assume the values I/R/S, that is, I for integer, R for a real datum, and S for a string.

Figure 9:
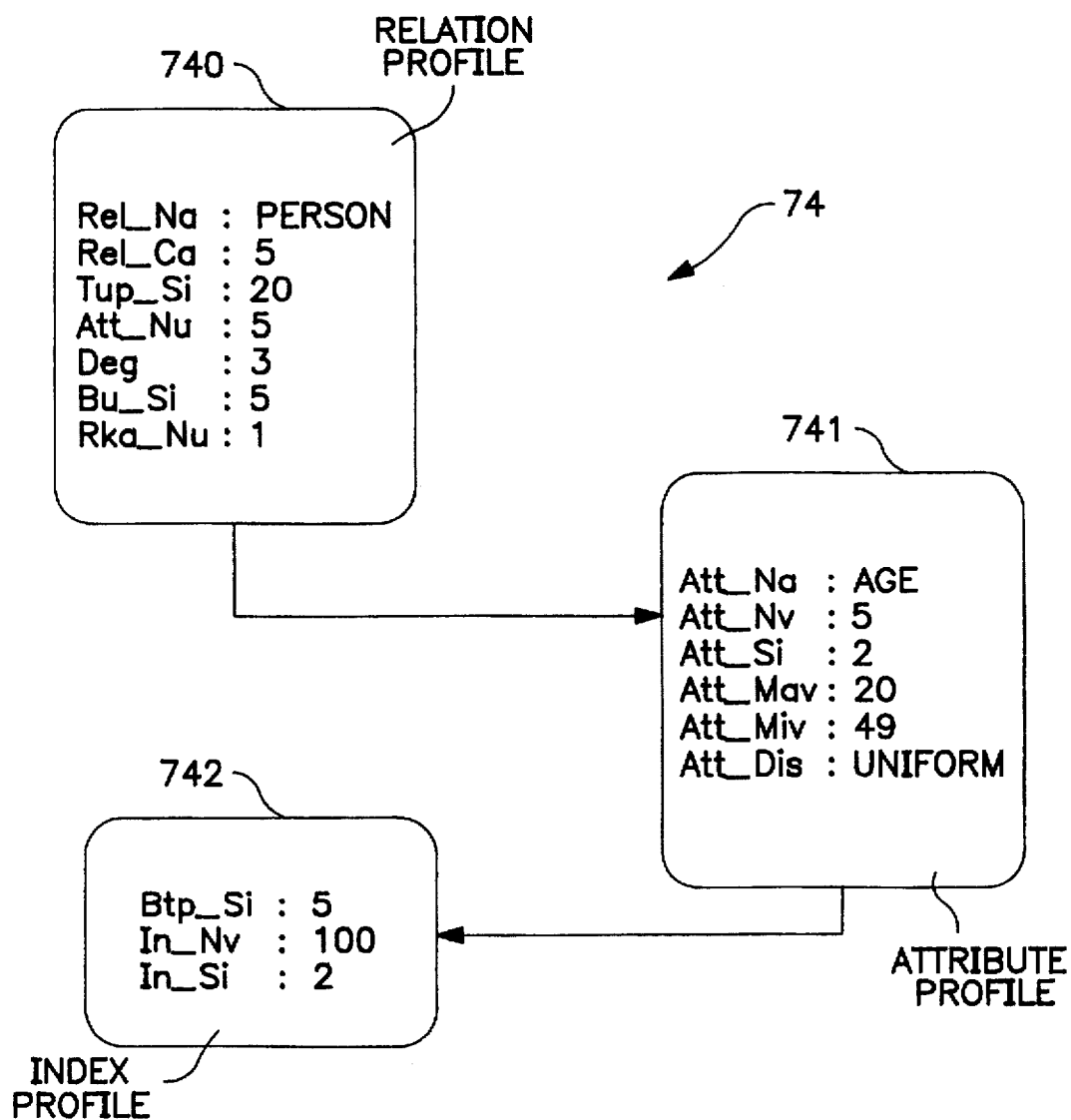
FIG. 9 shows the attributes for definition of the database profile.
Figure 12:
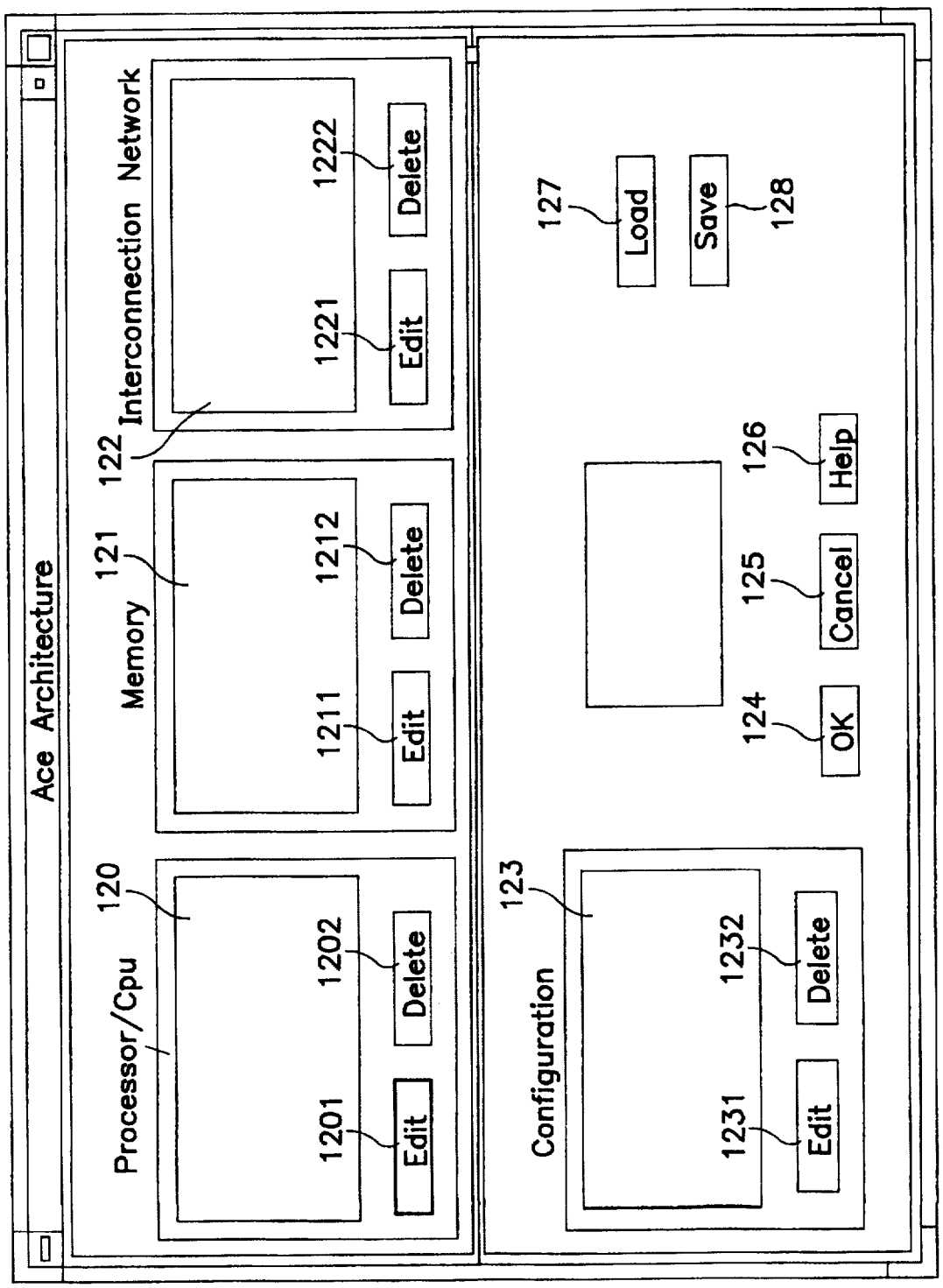
FIG. 12 shows a library architecture presentation window displayed by the presentation software.

The data base profile is simplified but representative of the knowledge of the layout of the data base. It also includes statistics on the data base. This data base profile is useful primarily in the evaluation model for estimating the size of the query results. This size is used to update the rate of memory occupation when the tuples of the result are materialized and is also necessary for estimating the time for executing the query. This library includes information on the data base structure, which is relation-oriented (relation, attribute, index). The components of the data base profile are shown in FIG. 9. Several data base profiles may be introduced into the library, with each profile identified by a data base name. The data base profile unit of the language ESL is used to specify the contents of the data base profile library in statistical terms. This profile shown in FIG. 9 is constituted by a relation profile (740), an attribute profile (741) and an index profile (742). An example of a relation profile (740) here includes the relation name (Rel-Na); the cardinality of the relation in terms of number of tuples (Rel-Ca); the size of the tuples in number of bytes (Tup-Si); the number of attributes in a tuple (Att-Nu); the degree (Deg) of parallelism in number of processors, representing the number of processors manipulating this relation at the same time; the memory access number for reading the key attributes (Rka-Nu); the size, in number of tuples, of data packets without semantics (Ch-Si); and the size, in number of tuples, of data packets with semantics (Bu-Si). The attribute profile (741) includes the number of attributes (Att-Nu); the number of distinct values for this attribute (Att-Nv); the mean size of the attribute in number of bytes (Att-Si); the maximum value of the attribute (Att-Mav); the minimum value of the attribute (Att-Miv); and the attribute value distribution (Att-Dis).

An index profile example (742) includes the size of the pages of the library tree in terms of the number of objects (Btp-Si); the number of index values (In-Nv); and the size of the key in number of bytes (In-Si).

The system library (72) takes into account, for example, information on the command system (process creation, management of the memories), the transactional system (management of the locks, initialization (login)), and information such as the size of the cache line in number of bytes (Cal-Si);

the size of the data bus between the processor and the cache in number of bytes (Dab-Si); the number of packets without semantics in the shared memory (Ch-Nu);

the number of packets with semantics in the shared memory (Bu-Nu);

the access time to the cache for reading or writing one datum (Cat);

the time taken by the central processing unit to calculate a comparison between two basic data (T-Comp);

the overtime associated with activating each operation (Ove-T). This information is used in the evaluation model. Finally, the library includes modeling of the access and operation methods, which describes the relation operator, such as a projection filter (Filter-Map) employed by a scanning algorithm to be applied to the tuple of the given relation as an input argument in the query in the LERA-PHY language. Thus for a given evaluation formula (100) shown in FIGS. 10A and B, in which an evaluation is done as a function of a certain number of parameters, such as $P_{CREAT}$, $C_i$, $C_{init\ scan}$, $C_{scan}$, which in turn are a function of evaluation depending on parameters defined in a projected filter (filter-map) algorithm, explained in part (101) of FIG. 10A.

The evaluation algorithms of the type (100) shown in FIG. 10B, constitute the evaluator (8). For more complete information on the evaluation models, one skilled in the art may refer to the report EP2025 DD11b3501, May 1990, by S. Andres, entitled "Study of some typical algorithms for a cost model definition", and to the report EP2025 DD11b3901, entitled "Cost model for a data base system in a distributed memory architecture".

In another embodiment of the invention, the libraries may be presented in a more user-friendly way by means of a library presentation and constitution software (9) that communicates with each of the libraries of the invention, over a link (90). This software (9) is also connected, via a link (91), with a mouse (10) which makes it possible to bring about external events. The mouse has been selected from the type with two buttons (100, 101), the button on the left (100) being conventionally assigned to the selection of zones or graphical objects on the screen and to calls to the editor, while the right-hand button (10) is assigned to specific operations, such as the manipulation of certain menus. The external events originating in the mouse are processed by a preprogrammed mouse interface incorporated in the software (9) and also capable of recognizing when a button is pushed (down) or released (up), the mouse trail (dragging), and logical events such as the entry of the mouse pointer into the window. On the screen, the position of the mouse pointer is represented by a small arrow pointing upward.

It is understood that without departing from the scope of the invention, the mouse could be replaced by any other pointer device, such as a light wand or a graphical table. Finally, to complete the mouse interface, an interface (92) is also provided for a keyboard (11) programmed for both character keys and control and pointer keys, so that in the editing mode, the information corresponding to the attributes of the various components of each of the libraries can be entered.

Figure 17:
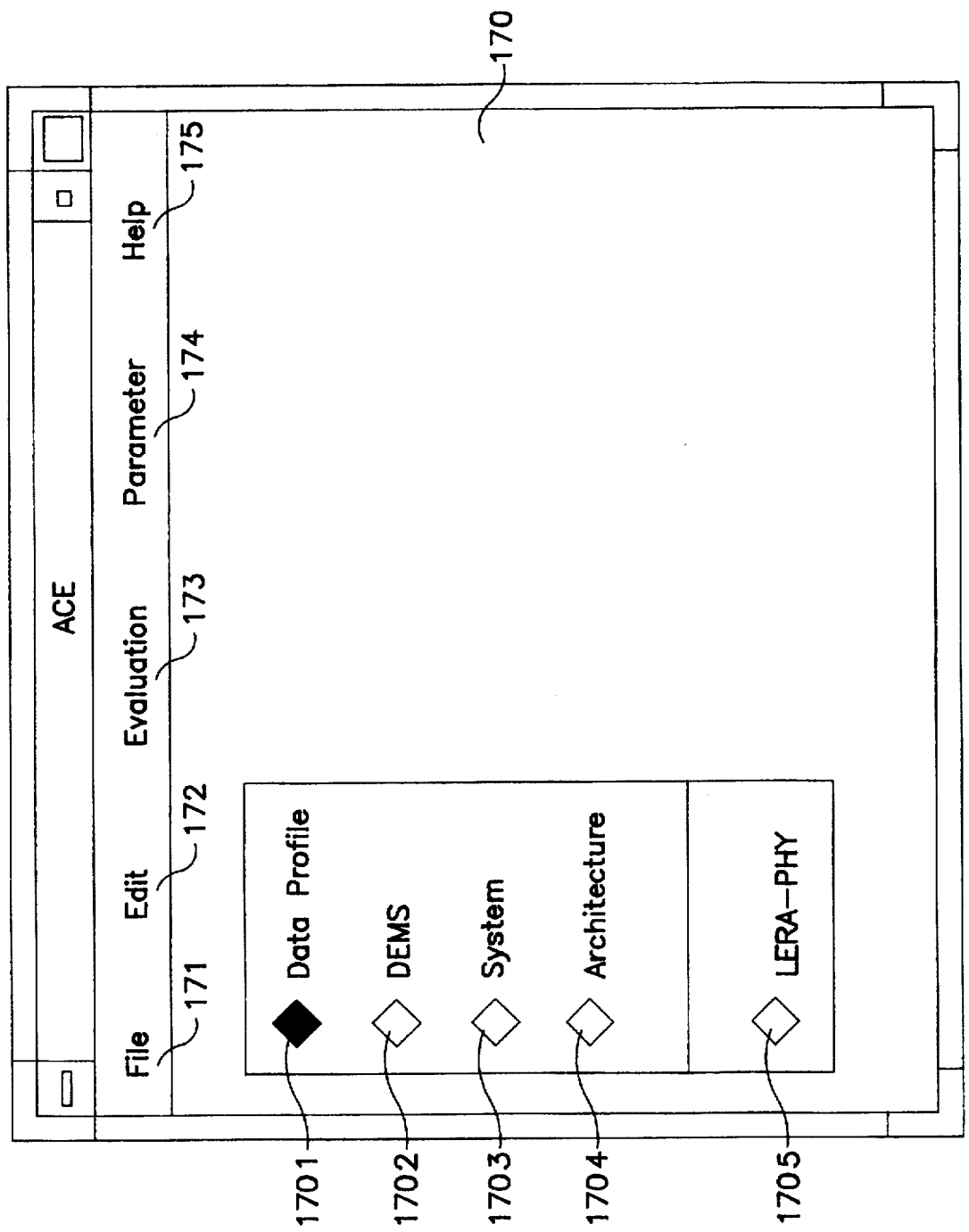
FIG. 17 shows the initial window displayed by the presentation software for selecting one of the possible actions upon one of the libraries of the apparatus.
Figure 18A:
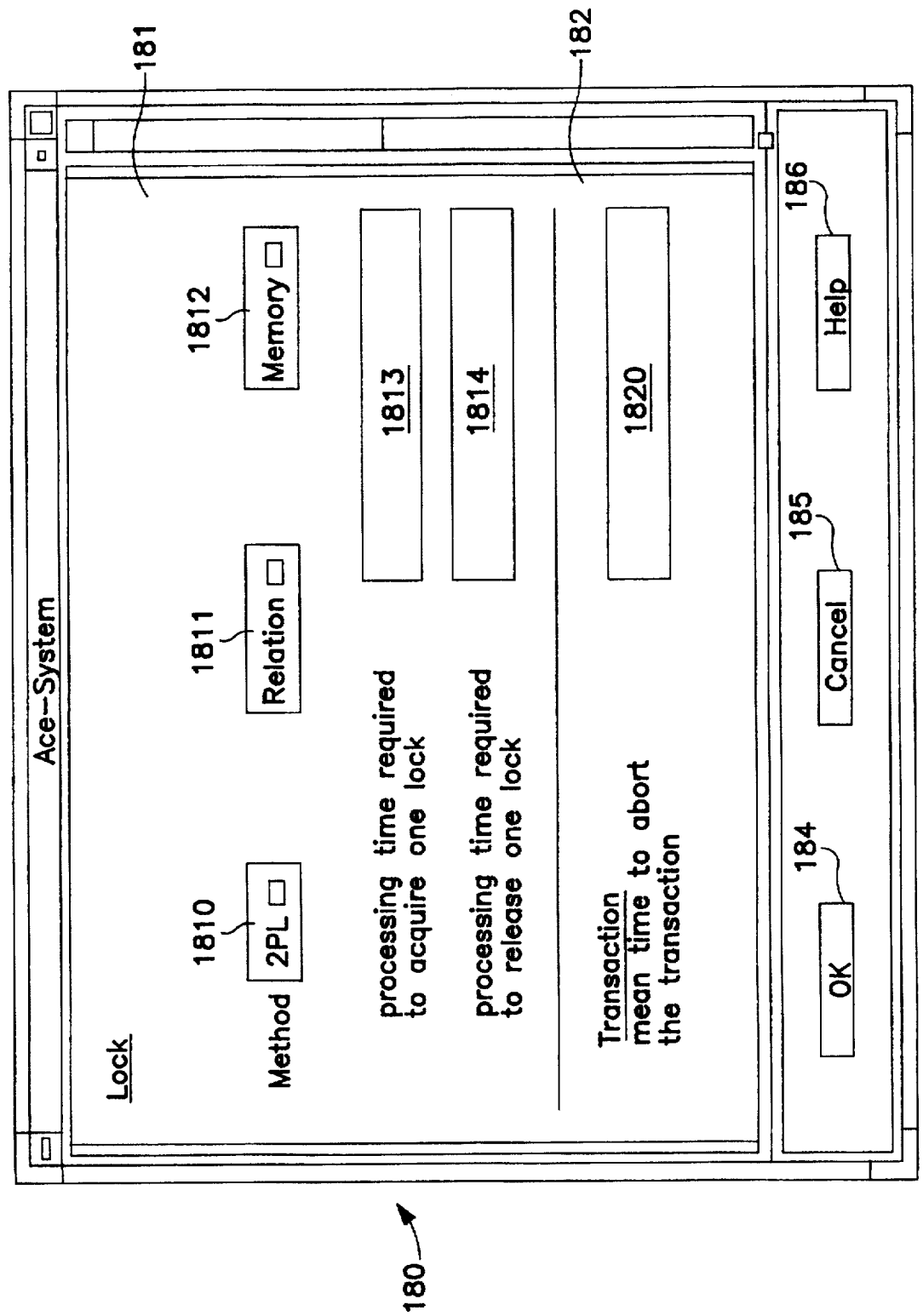
FIG. 18A, B, and C show the windows making it possible to display the characteristics of the system once the component selections have been made and the evaluation has been started.
Figure 18B:
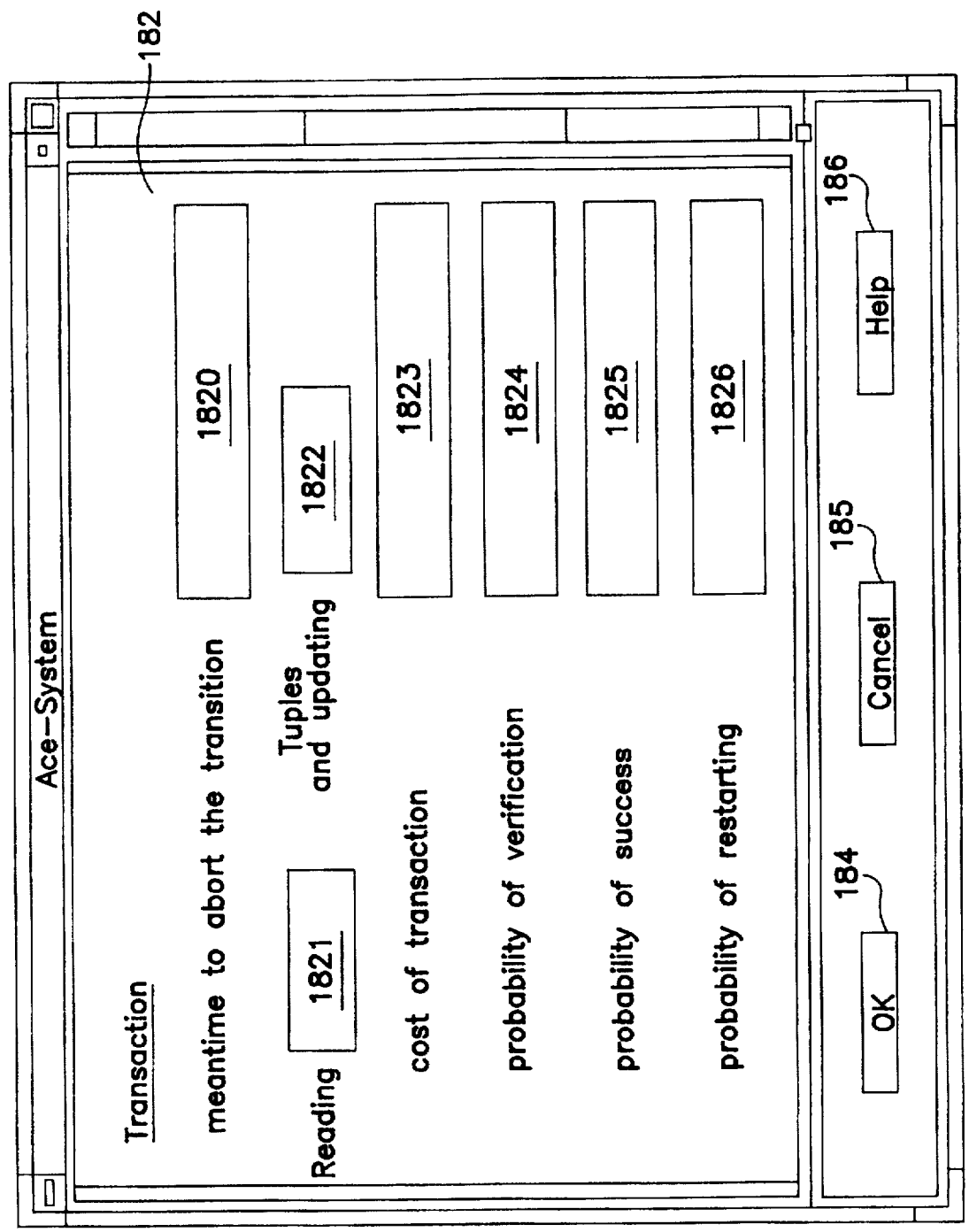
Figure 18C:
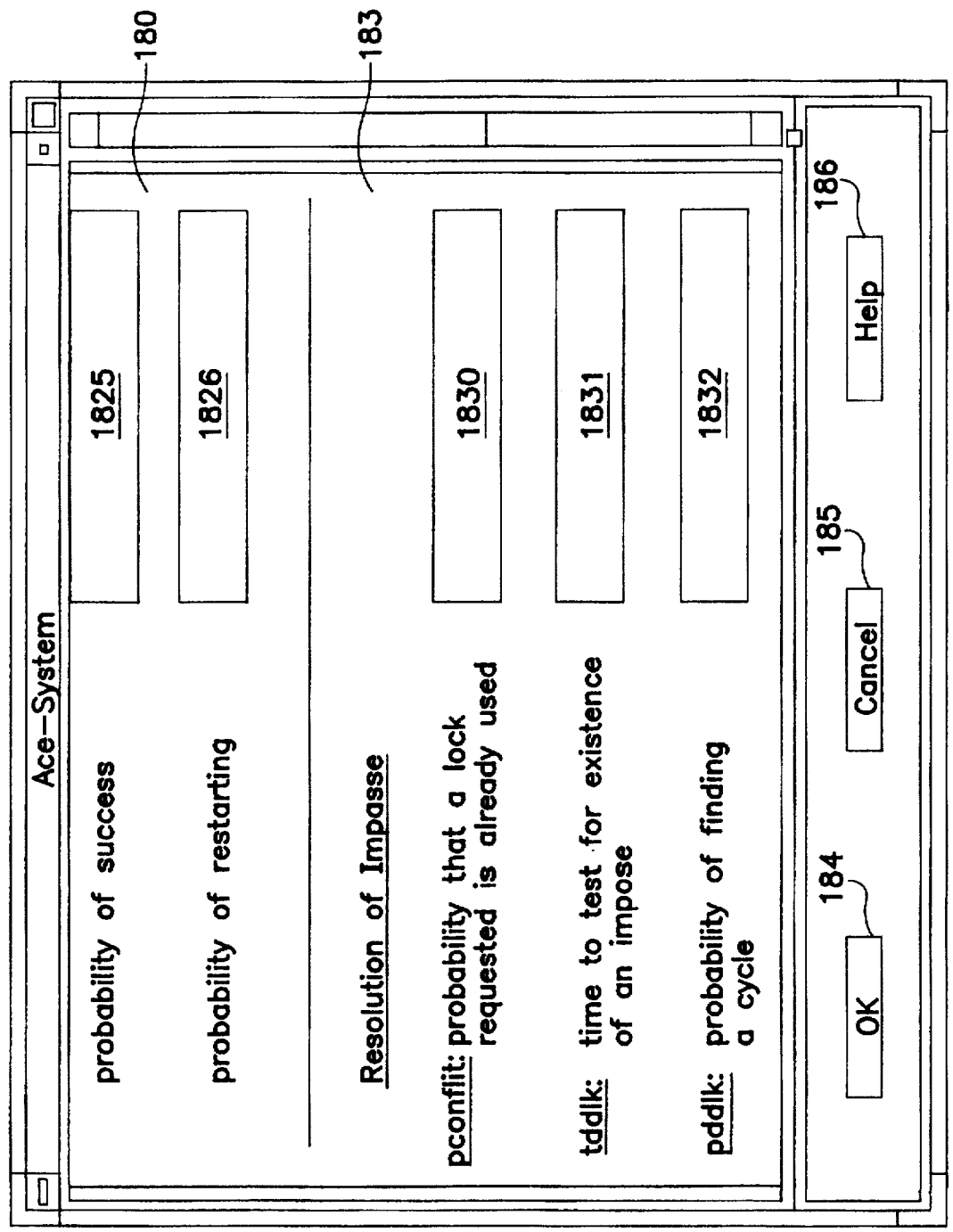

This presentation software (9) includes a program enabling display of the various windows of FIGS. 12–18; this program assures the presentation, when the information processing system is turned on, of the first window in FIG. 17, on which a box (170) is displayed that includes five components, each of them activatable by a square button (1701–1705). A first component (1701) activates the presentation of the data base profile. A second component (1702) activates the presentation of the profile of the data base management systems library; a third component (1703), which models the operational and transactional systems and is marked "SYSTEM" enables effecting the system presentation; and corresponding to the display in FIGS. 18, a fourth component (1704), "ARCHITECTURE", enables effecting the presentation of the architecture corresponding to the display of FIG. 12, and a fifth component (1705), "LERA-PHY", enables formulating a query. This initial window (170) also includes a menu bar, with which an editing menu (172), an evaluation menu (173), a parameter definition menu (174) and a file menu (171), as well as a help menu (175), can be called up. When the square box (1704), "ARCHITECTURE", is selected with the mouse, the thus-activated program enables the display on the screen (11) of the presentation corresponding to FIG. 12.

The window "ARCHITECTURE" displayed includes a first selection box (120) with vertical scrolling, making it possible to display the configurations of the processors used in the architecture, editing them with an editing button (1201), and eliminating certain configurations of processors with the elimination button (1202). The box with scrolling (12) also makes it possible, by selecting highlighting and validation via the OK button (124), to select the processor of the architecture for which the evaluation is to be done. A second box (121) with vertical scrolling also makes possible either the selection or editing of a memory configuration to be used in the architecture for which the evaluation is to be done. As for the previous box, this box includes an editing button (1211) and a delete button (1212). A third vertical scrolling box (122) enables editing or selection of an interconnection network configuration, and by the use of the editing (1221) and delete (1222) buttons, makes it possible to edit or delete a new configuration. Finally, a fourth scrolling box (123) enables editing or selecting the configuration. This box also includes editing (1231) and delete (1232) buttons. A cancel button (125) and a help button (126) make it possible to cancel the selections made or to request help. The load (127) and save (128) buttons enable loading the architectures or saving the edited architectures.

Figure 13:
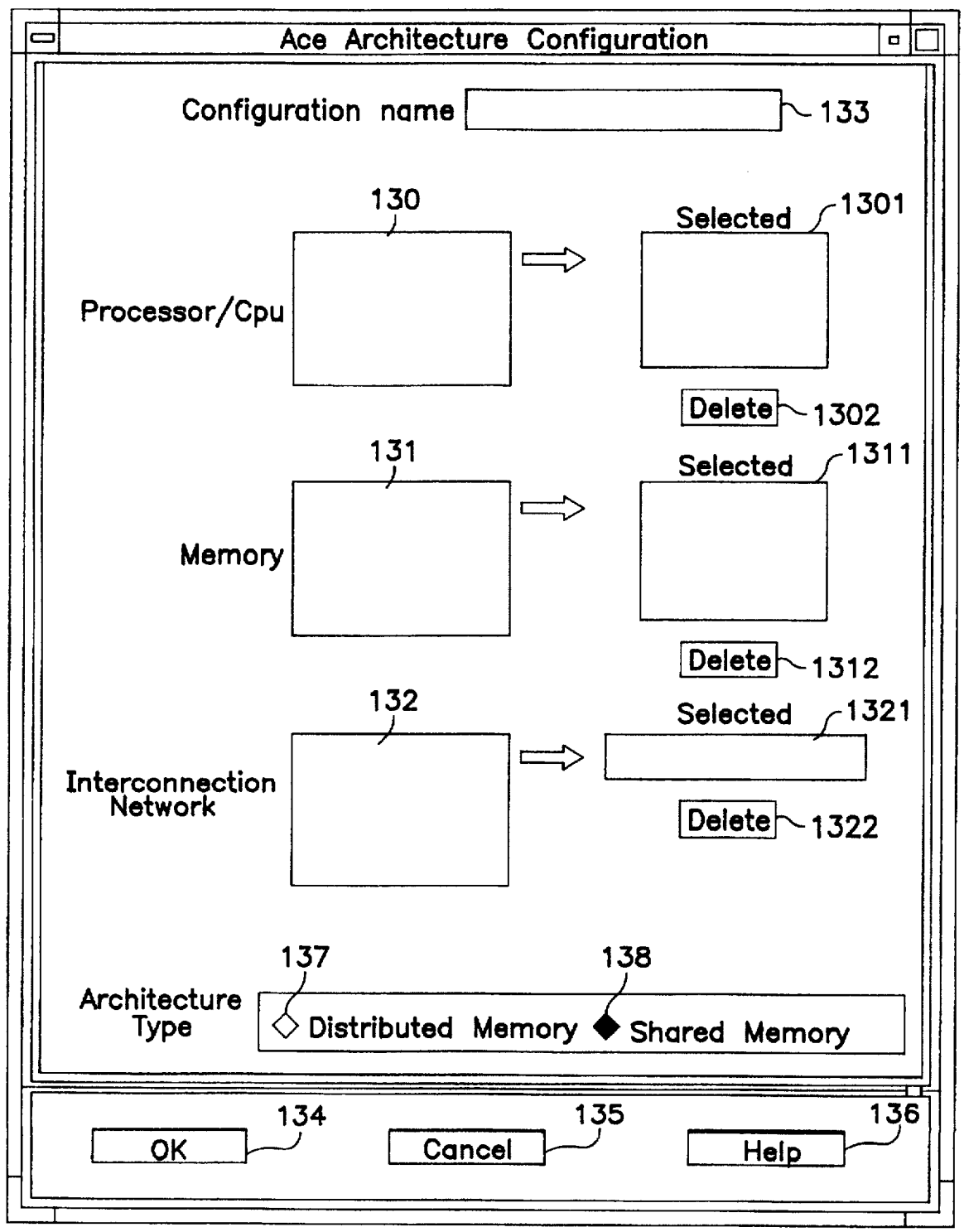
FIG. 13 shows a presentation window displayed by the presentation software, for making the selection of the architecture configuration.

FIG. 13 shows the architecture configuration selection window (130), in which the name of a configuration appears or is written in the box (133), and the available configurations appear in the box (130) for the processor, in box (131) for the memory, and in the box (132) for the interconnection network. This presentation makes it possible for the respective configuration selected for processes, memories and interconnection networks, to appear in a specific box (1301, 1311, 1321). Specific buttons (1302, 1312, 1322) enable deleting one of the elements of the configuration. In addition, an architecture classification as to distributed memory or shared memory type may be selected by action upon the respective buttons (137, 138). This architecture classification as distributed memory or shared memory may also be made automatically by the classification procedure and classification device described in French Patent Application No. 9115812 filed on Dec. 19, 1991.

Figure 14A:
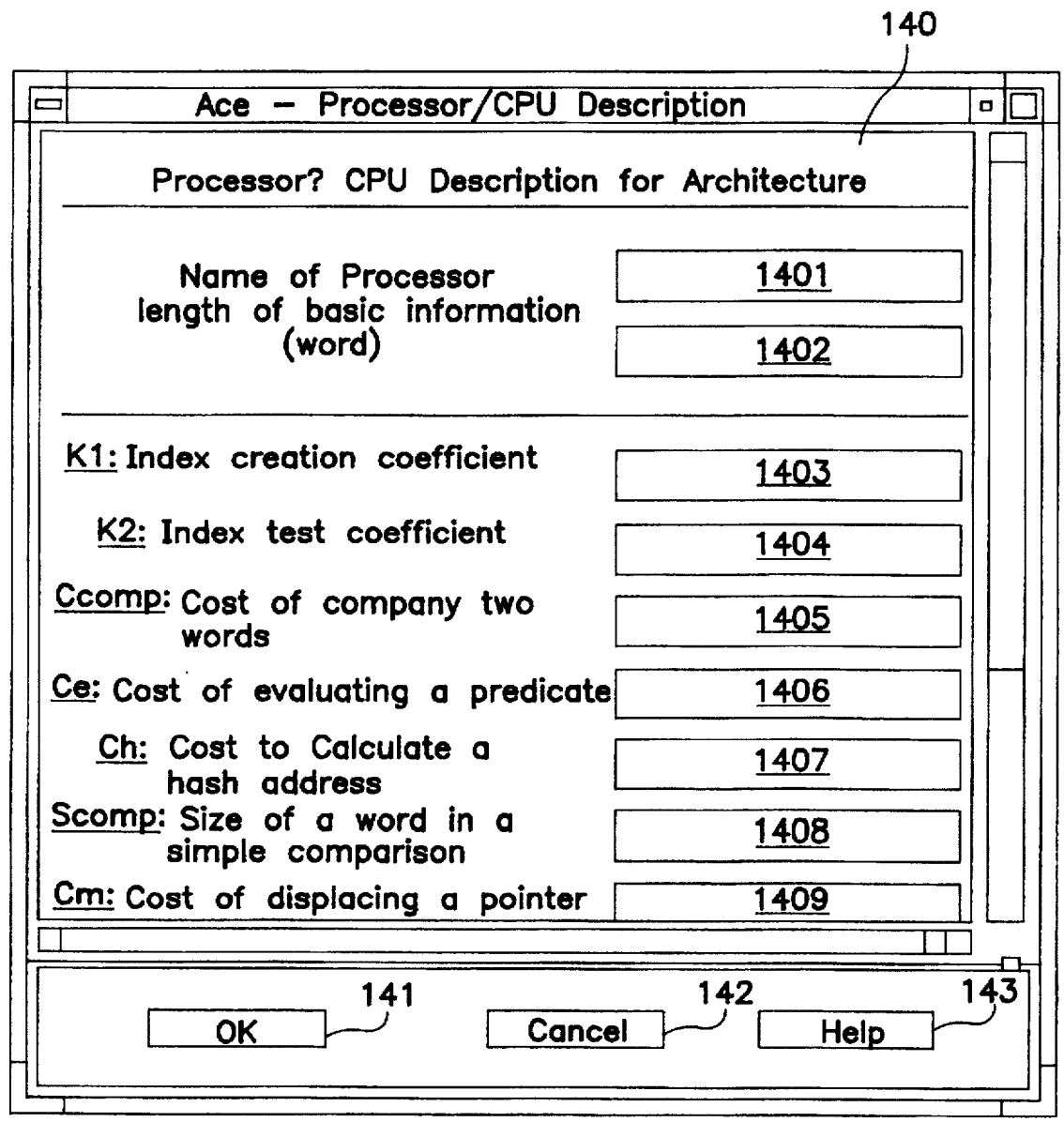
Figure 15:
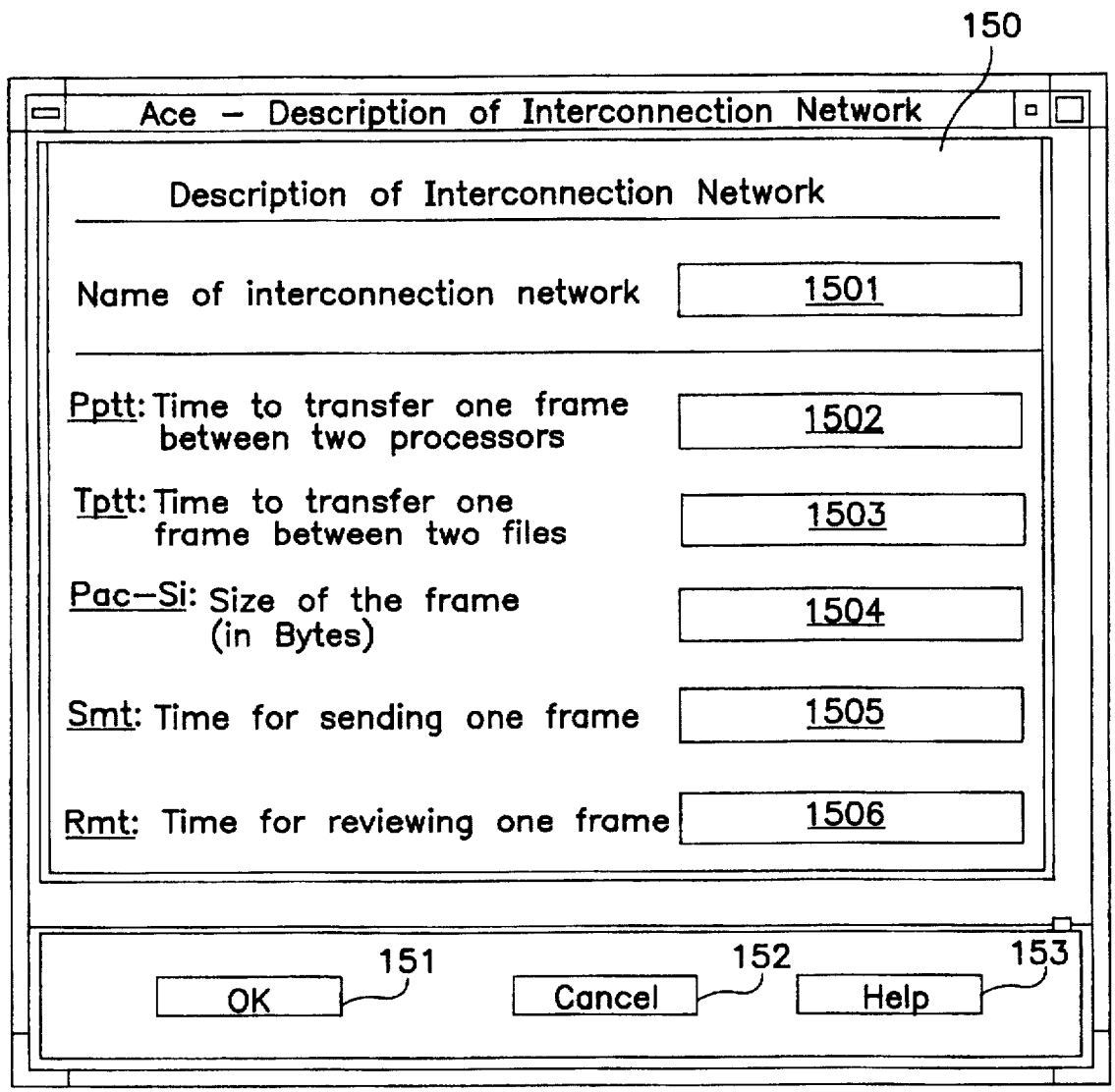
FIG. 15 shows the window displayed by the library presentation and constitution software for editing the description of a network component of the library.
Figure 16:
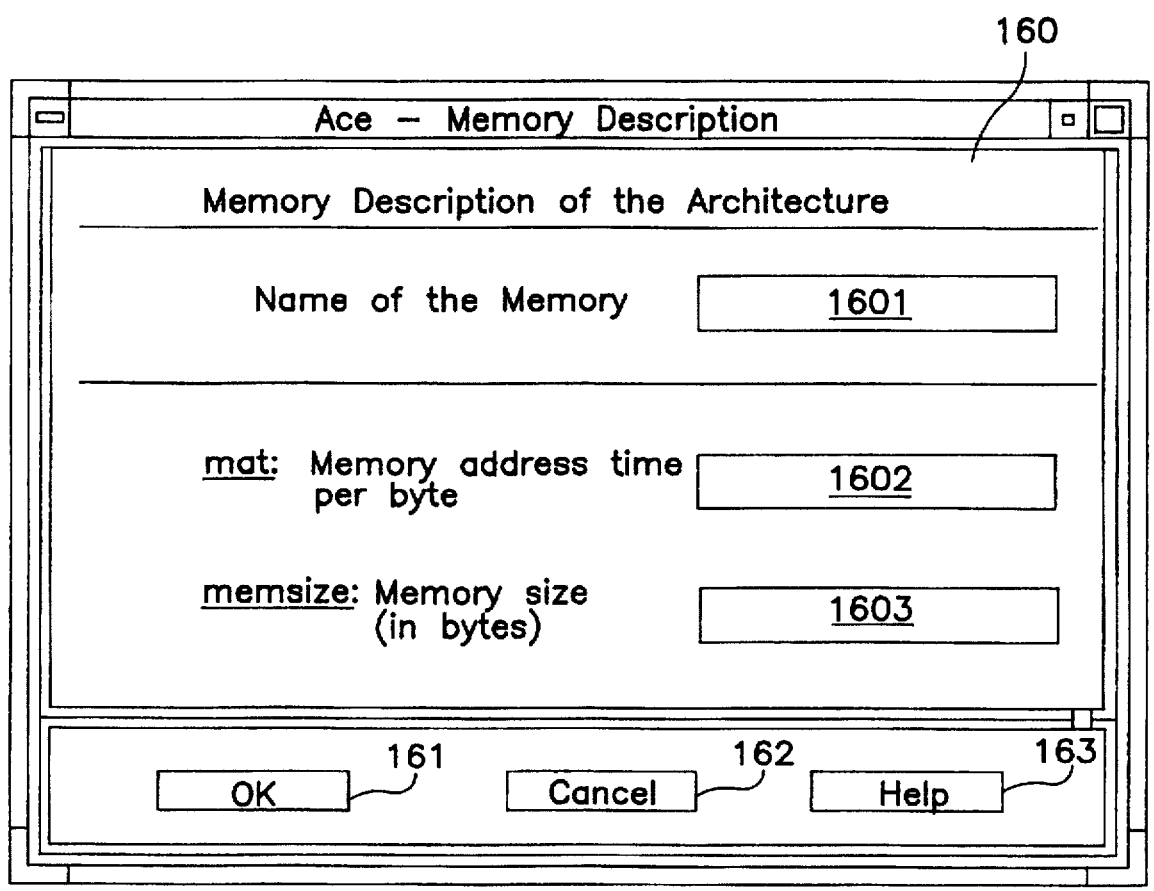
FIG. 16 shows the window displayed by the library presentation and constitution software for editing the description of a memory component of the library.

In the editing mode, once a line is selected, for example in the scrolling processor description box (120) for entering a new processor configuration, the software makes a processor description window (140) appear in the next processing stage, in which a first box (1401) enables inputting the processor name; a second box (1402), the length of the basic information; a third box (1403), the index creation coefficient "K1"; a fourth box (1404), an index test coefficient "K2"; a fifth box (1405), the cost of a simple comparison between two basic data "Ccomp"; a sixth box (1406), the attribute "Ce" described above; a seventh box (1407), the attribute "Ch" representing the cost for calculating a calculated address; the eighth box (1408), the attribute "Scomp" described above; the ninth box (1409), the attribute "Cm"; the tenth box (1410) shown in FIG. 14B, the attribute "Ct" representing the cost for creating a file; the eleventh box (1411), the attribute "Ci"; the twelfth box (1412), the attribute "np" representing the processor number; and the thirteenth box (1413), the attribute "Cs" described above. Editing is done by pointing to the box with the aid of the arrow and clicking on it, then at the keyboard inputting the information corresponding to the attribute of the box in which one is working. After the information has been input, the validation is done by pointing and validation with the validation buttons (141). Cancelling is done by pointing and validation with the cancel button (142). Finally, a help button (143) enables activation of a help menu.

When the editing function (1221, FIG. 12) of an interconnection network has been selected, the software causes the presentation window (150) to appear, which includes a first box (1501) with which a name can be given to the interconnection network; a second box (1502) with which the parameter (Pptt) of the time to transfer one frame between two processors can be determined; a third box (1503) with which the attribute "Tptt" for the transfer time of one frame between two files can be determined; a fourth box (1504) with which the size of a frame in number of bytes, "Pac-Se" can be determined; a fifth box (1505) with which the attribute "Smt" for the time for sending a frame can be determined; and a sixth box (1506) enabling determining the attribute "Rmt", for the time for receiving one frame. This window also includes a validation button (151), a cancel button (152), and a help procedure call button (153).

Finally, the selection of the editing function (1211) of a memory architecture begins; via the presentation software, the display of a window (160, FIG. 16) makes it possible in a first box (1601) to indicate the name of the memory, in a second box (1602) to indicate the memory access time per byte, "mat", and in a third box (1603), to determine the size in bytes of the memory; as above, this window includes buttons for validation (161), cancelling (162), and calling a help procedure (163).

Calling up the system library by means of the button (1703) enables the display of a window (180, in FIGS. 18A–18C), including a first locking zone (181), a second transaction zone (182), and a third unlocking zone (183), for taking into account the information on the command system.

The first zone enables selecting a two-phase (2PL) locking method via a box (1810); a second zone constituted by a box (1811) enables selecting the granularity, that is, the locking level of the information (page, tuple, relation) to enable concurrent access to this information; and a third zone (1812), via a box, makes it possible to select a table of locks on the information. A box (1813) enables inputting the attribute concerning the processing time required for acquiring a lock; a box (1814) enables parametrizing the necessary processing time for unlocking a lock. A first zone of the transaction zone (1820) enables displaying the mean time to abort a transaction; a second zone enables displaying the probability of success; a second zone of the transaction zone enables displaying the orders in which tuples are read, in a box (1821), and the orders of updating tuples, in a box (1822); a third zone (1823) enables displaying the cost of the transaction; a fourth zone (1824) enables displaying the probability of verification; a fifth zone (1825) enables displaying a probability of success; and finally, a sixth zone (1826) makes it possible to display the probability of restarting. A first zone (1830) of the impasse resolution zone enables displaying the "Pconflit" attribute, which expresses the probability that a lock requested is already used; a second zone (1831) enables displaying the attribute "Tddlk", which expresses the time for testing the existence of an impasse, and a third zone (1832) enables displaying the attribute "Pddlk", which expresses the probability of finding a cycle. Thus thanks to the attributes input with the aid of either the presentation software or conventional software, each of the libraries is completed, and the evaluation algorithm, based on the information furnished it by the libraries on the configurations selected or on the ways of formulating the query, makes it possible to evaluate the cost of a query, in the given selected configuration and/or with the execution procedure of the query selected.

This kind of software also has the advantage, for a given query that has a plurality of layouts or formats enabling execution of the query in the data base, of making it possible to determine what the cost of each of these format modes is, and hence of speeding up or slowing down the interrogation. In searching for all red vehicles, for example, the formatting mode will make it possible to determine whether the search should begin with vehicles having a certain price structure, or should go by manufacturer's model names, serial number, or any other format that may be useful for the data base. Thus by way of these various libraries, the performance evaluation apparatus can be used regardless of the type of architecture or data base or query formulated, and by its presentation software, this apparatus makes easier for the user to employ it.

Any modifications within the competence of one skilled in the art are also within the scope of the invention.

I claim:

1. An apparatus for adaptable performance evaluation of an application, including queries by analytical resolution of a data base, comprising an information processing system having a given architecture, including a modeling knowledge memory library containing knowledge of a specific environment of the data base and a local optimizer which uses a performance evaluator to evaluate the application and select an optimal plan for execution thereof, using the information of the knowledge library including information on said given architecture, said knowledge library including:

an architecture library modeling hardware architectures;

a system library modeling operational and transactional systems supported by the hardware architectures;

an access and operation method library modeling algorithms used by a data management system; and a data base profile library for collecting knowledge on data base layout and statistics for an application; and further wherein:

said evaluator is operable to evaluate the application as a function of at least one parameter selected among a plurality of parameters, said plurality of parameters being defined by projected filter algorithms applied to said knowledge library.

2. The apparatus of the claim 1, wherein said at least one parameter is a cost of creating a process ($P_{creat}$) which represents the cost of executing a single instruction on a current system $C_i$ multiplied by the number of instructions necessary for creating the process.

3. The apparatus of claim 2, wherein said information processing system includes a display having an architecture configuration window which enables display and selection of description windows for cpu, memory and interconnection network components that constitute said architectures, and further including means for evaluating cost of queries, said means for evaluating being operable to exchange information with said optimizer and said knowledge library.

4. The apparatus of claim 1, wherein said at least one parameter represents a cost ($C_{initscan}$) for initializing a scan and getting a first tuple evaluated.

5. The apparatus of claim 4, wherein the parameters ($C_{initscan}$) and ($C_{scan}$) are functions of evaluation depending on parameters defined in projected filter algorithms taking into account at least one of the following parameters: R.card, $C_{next}$, $C_j$, pred-est (qualif), $C_e$, and $C_{init}$.

6. The apparatus of claim 4, wherein said information processing system includes a display having an architecture configuration window which enables display and selection of description windows for cpu, memory and interconnection network components that constitute said architectures, and further including means for evaluating cost of queries, said means for evaluating being operable to exchange information with said optimizer and said knowledge library.

7. The apparatus of claim 1, wherein the parameters ($C_{initscan}$) and ($C_{scan}$) are functions of evaluation depending on parameters defined in projected filter algorithms taking into account at least one of the following parameters: R.card, $C_{next}$, $C_j$, pred-est (qualif), $C_e$, and $C_{init}$.

8. The apparatus of claim 7, wherein said information processing system includes a display having an architecture configuration window which enables display and selection of description windows for cpu, memory and interconnection network components that constitute said architectures, and further including means for evaluating cost of queries, said means for evaluating being operable to exchange information with said optimizer and said knowledge library.

9. The apparatus of claim 1, wherein said at least one parameter is a cost ($C_{scan}$) for fetching next tuples and evaluating a predicate of the query therewith.

10. The apparatus of claim 9, wherein the parameters ($C_{initscan}$) and ($C_{scan}$) are functions of evaluation depending on parameters defined in projected filter algorithms taking into account at least one of the following parameters: R.card, $C_{next}$, $C_j$, pred-est (qualif), $C_e$, and $C_{init}$.

11. The apparatus of claim 9, wherein said information processing system includes a display having an architecture configuration window which enables display and selection of description windows for cpu, memory and interconnection network components that constitute said architectures, and further including means for evaluating cost of queries, said means for evaluating being operable to exchange information with said optimizer and said knowledge library.

12. The apparatus of claim 1, wherein said information processing system includes a display having an architecture configuration window which enables display and selection of description windows for cpu, memory and interconnection network components that constitute said architectures, and further including means for evaluating cost of queries, said means for evaluating being operable to exchange information with said optimizer and said knowledge library.

13. The apparatus of claim 12, wherein said architecture library includes information indicating whether an architecture is classified as a distributed memory architecture, a shared memory architecture, or a combination of distributed and shared memory architectures.

14. The apparatus of claim 12, wherein the performance evaluator comprises two layers, one layer executing local evaluations and another layer executing non-local (communication and materialization) evaluations.

15. The apparatus of claim 12, wherein the local optimizer operatively explores only various local algorithms and is limited to one calculator node at a time.

16. The apparatus of claim 12, wherein said description windows include a certain number of boxes to be filled, under control of an editor, once a box is activated with a button on a mouse, to enable inputting attributes of each library through a keyboard, and a box making it possible to assign a name to a set of attributes of one component of said architecture.

17. The apparatus of claim 12, further including a compiler, including a program (PARSE) for syntactical and semantic analysis of extractions requested, communicating with a catalog manager and optimizer-parallelizer software;
the catalog manager enabling the syntactical and semantic analysis program (PARSE) to perform semantic verifications;
the optimizer-parallelizer software performing:
a) rewriting of extractions in a logical optimization routine;
b) production of an optimal execution plan in a physical optimization routine; and
c) explicit formulation of execution strategy in a parallelization routine fixed by physical optimization.

18. The apparatus of claim 12, further including a compiler, including a program (PARSE) for syntactical and semantic analysis of extractions requested, communicating with a catalog manager, with optimizer-parallelizer software, with a presentation software and a cost evaluation software, wherein results of cost evaluation are presented in a form constituted by a window divided into an object locking zone, a transaction zone, and an impasse resolution zone.

19. The apparatus of claim 12, wherein the data base profile library contains information on the structure of the data base, which is relationally oriented (relation, attribute, index).

20. The apparatus of claim 19, wherein the data base profile library takes the following information into account:
name of a relation (Rel-Na);
cardinality in number of tuples (Rel-Ca);
size of the tuples in number of bytes (Tup-Si);
attribute number in a tuple (Att-Nu);
degree of parallelism in a processor number, furnishing the number of processors simultaneously manipulating the relation (Deg);
memory access number for reading key attributes (Rka-Nq);
size of a data packet in number of tuples, without semantics (Ch-Si); and
size in number of tuples of a data packet, with semantics (Bq-Si);
and for attributes that the relation contains:
a name of the attribute (Att-Na);
a number of distinct values for the attribute (Att-Nv);
mean size of the attribute in number of bytes (Att-Si);
maximum value of the attribute (Att-Mav);
minimum value of the attribute (Att-Miv); and
distribution of attribute values (Att-Dis);
and in the case of indexes:
size of a tree page B in number of objects (Btp-Si);
number of index values (In-Nv); and
size of an index key in number of bits (In-Si).

21. The apparatus of claim 12, further including means for performing global optimization which takes into account communications and construction of intermediate results from said local optimizer and generates a final result.

22. The apparatus of claim 21, wherein the means for performing global optimization includes a parallelizer which determines a global algorithm used to perform inter-operation parallelism among calculator nodes.

23. The apparatus of claim 22, wherein the global algorithm specifies which nodes are involved and how the intermediate results are shared.

24. The apparatus of claim 12, wherein the knowledge library includes an attribute that defines memory in numbers of bytes (Mem-Si);
an attribute defining access time per byte (MAT);
an attribute defining execution time by a processor of a single instruction ($C_i$);
an attribute defining execution time by the processor of a displacement of a pointer ($C_m$);
an attribute defining maximum data size in a simple comparison ($S_{comp}$);
an attribute defining cost of a simple comparison between two basic data ($C_{comp}$);
an attribute defining cost for calculating an address calculated by a hashing function ($C_h$);
an attribute defining cost of evaluating a simple predicate ($C_e$);
an attribute defining cost of a basic sorting operation ($C_s$);
an attribute defining frame size in number of bytes (Pac-Si);
an attribute defining time for sending one frame ($S_m t$);
an attribute defining time for receiving a frame ($R_{mt}$); and
an attribute defining time for transferring one frame between two processors ($P_u$); and
a description of architecture by components thereof.

25. The apparatus of claim 24, wherein the knowledge library is associated with library presentation and description software.

26. The apparatus of claim 25, wherein the presentation software is associated with an architecture selection form taken into account for the evaluation process, executed by the performance evaluator.

27. The apparatus of claim 25, wherein the presentation and description software enables the display of at least one specific window for each library for providing a description thereof.

28. The apparatus of claim 12, wherein the knowledge library is associated with library presentation and description software.

29. The apparatus of claim 28, wherein the presentation software is associated with an architecture selection form taken into account for the evaluation process, executed by the performance evaluator.

30. The apparatus of claim 29, wherein the presentation and description software enables the display of at least one specific window for each library for providing a description thereof.

31. The apparatus of claim 29, wherein the architecture selection form includes a window with a plurality of scrolling boxes, for selecting for each box associated with each component (CPU, memory, network) constituting the architectures of the architecture library, by way of names assigned to the components, attributes defining the component corresponding to a desired architecture configuration, by highlighting and validating via a validation button (OK).

32. The apparatus of claim 31, wherein the architecture selection form includes one component selection button, highlighted, in each scrolling box.

33. The apparatus of claim 31, wherein the architecture selection form includes a load button and a save button.

* * * * *